United States Patent
Tseng et al.

(10) Patent No.: US 11,816,289 B1
(45) Date of Patent: Nov. 14, 2023

(54) TOUCH DISPLAY DEVICE AND OPERATING METHOD FOR TOUCH DISPLAY DEVICE

(71) Applicant: HIMAX TECHNOLOGIES LIMITED, Tainan (TW)

(72) Inventors: Po-Kai Tseng, Tainan (TW); Jing-Ho Chen, Tainan (TW); Chien-Cheng Liao, Tainan (TW); Chih-Chen Tsai, Tainan (TW); Li-Lin Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/833,910

(22) Filed: Jun. 7, 2022

(51) Int. Cl.
*G06F 3/041* (2006.01)

(52) U.S. Cl.
CPC .......... *G06F 3/0418* (2013.01); *G06F 3/0412* (2013.01); *G06F 3/04166* (2019.05)

(58) Field of Classification Search
CPC ...... G06F 3/0418; G06F 3/0412; G06F 3/044; G06F 3/04166
See application file for complete search history.

(56) References Cited

U.S. PATENT DOCUMENTS

| | | | | |
|---|---|---|---|---|
| 2014/0198059 A1* | 7/2014 | Gu | ......... | G06F 3/044 345/173 |
| 2020/0201475 A1* | 6/2020 | Mani | ...... | G06F 3/0412 |
| 2021/0350763 A1* | 11/2021 | Okamura | ....... | G06F 3/0412 |
| 2022/0244812 A1* | 8/2022 | Park | ....... | G06F 3/0446 |

* cited by examiner

*Primary Examiner* — Hong Zhou
(74) *Attorney, Agent, or Firm* — JCIPRNET

(57) ABSTRACT

A touch display device and an operating method for the touch display device are provided. The touch display device includes a touch display panel, a touch display driving circuit and a computing circuit. The touch display driving circuit drives the touch display panel to perform a display operation based on a scan frequency and to perform a touch sensing operation based on a plurality of touch sensing cycles. The computing circuit determines a plurality of scan finishing positions on the touch display panel in response to the scan frequency and the touch sensing cycles, receives a touch sensing data corresponding to the scan finishing positions, and compensates the touch sensing data based on a base value.

12 Claims, 4 Drawing Sheets

TOUCH DISPLAY DEVICE AND OPERATING METHOD FOR TOUCH DISPLAY DEVICE

TECHNICAL FIELD

The disclosure generally relates to a display device, and more particularly to a touch display device and an operating method for the touch display device.

DESCRIPTION OF RELATED ART

Generally, a touch display device performs a display operation and a touch sensing operation. However, when touch display device the touch sensing operation, a scan driving of the display operation may interfere with the touch sensing operation, so as let the touch sensing operation generates noises. The touch sensing operation is affected by these noises, resulting in ghost points and/or split points. Therefore, how to reduce the affected on the touch sensing operation by these noises is one of the research and development focuses of those skilled in the art.

SUMMARY

The disclosure is related to a touch display device and an operating method for the touch display device. The touch display device and the operating method reduce the affected on the touch sensing operation by noises from a scan driving of the display operation.

The disclosure provides a touch display device. The touch display device includes a touch display panel, a touch display driving circuit and a computing circuit. The touch display driving circuit is coupled to the touch display panel. The touch display driving circuit drives the touch display panel to perform a display operation based on a scan frequency and to perform a touch sensing operation based on a plurality of touch sensing cycles. The computing circuit is coupled to the touch display driving circuit. The computing circuit determines a plurality of scan finishing positions on the touch display panel in response to the scan frequency and the touch sensing cycles, receives a touch sensing data corresponding to the scan finishing positions, and compensates the touch sensing data based on a base value.

The disclosure provides an operating method for a touch display device. The touch display device comprises a touch display panel and a touch display driving circuit. The operating method comprising: driving, by the touch display driving circuit, the touch display panel to perform a display operation based on a scan frequency and to perform a touch sensing operation based on a plurality of touch sensing cycles; determining a plurality of scan finishing positions on the touch display panel in response to the scan frequency and the touch sensing cycles; receiving a touch sensing data corresponding to the scan finishing positions; and compensating the touch sensing data based on a base value.

Based on the above, in the disclosure, the touch display device and the operating method determine the scan finishing positions on the touch display panel in response to the scan frequency and the touch sensing cycles. Therefore, the touch display device and the operating method obtain the scan finishing positions. The touch display device and the operating method receive the touch sensing data corresponding to the scan finishing positions and compensate the touch sensing data based on the base value. Therefore, the touch display device and the operating method reduce the affected on the touch sensing operation by noises located on the scan finishing positions.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
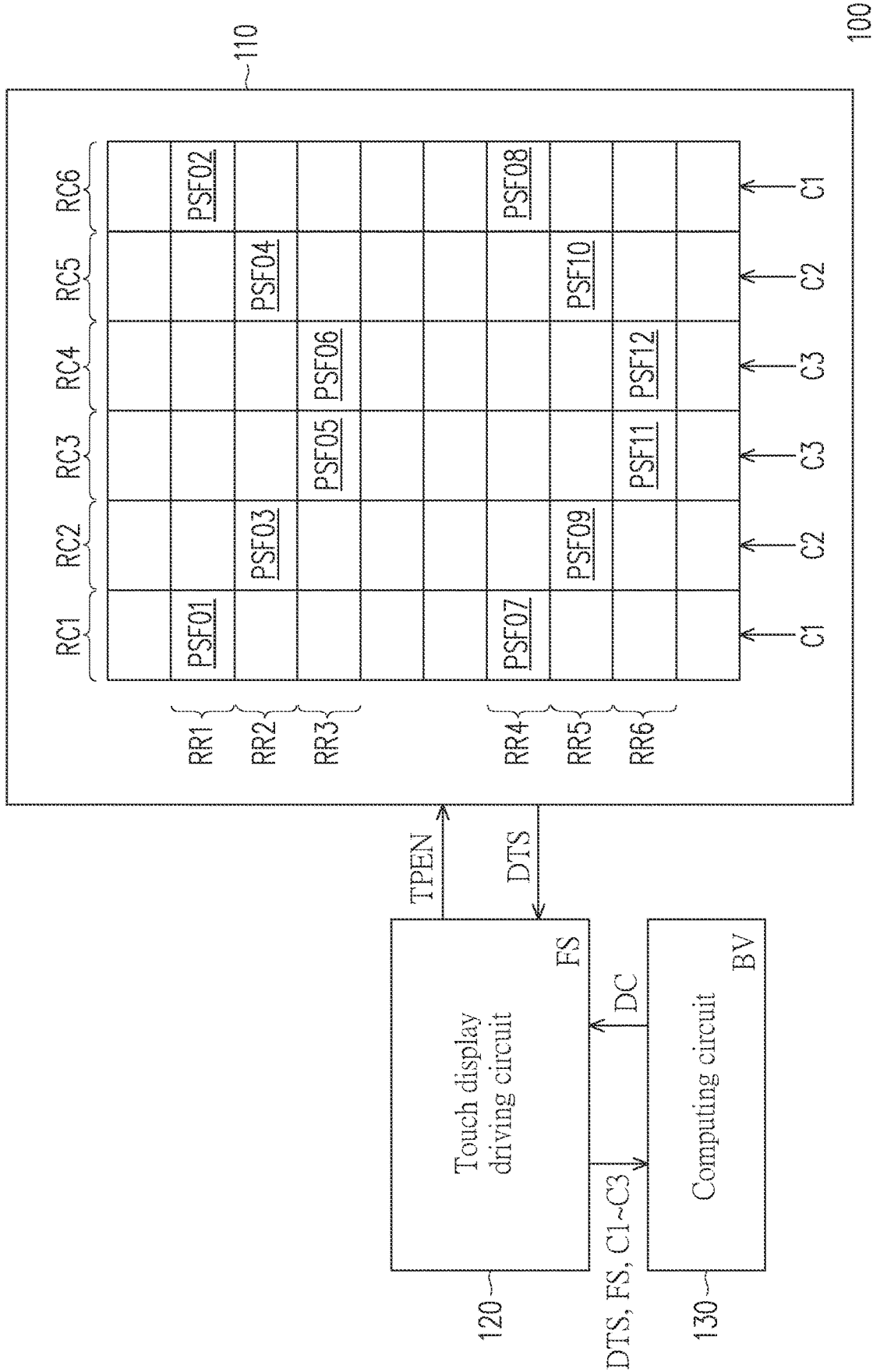
FIG. 1 illustrates a schematic diagram of a touch display device according to a first embodiment of the disclosure.

FIG. 1 illustrates a schematic diagram of an electronic device according to a first embodiment of the disclosure. Referring to FIG. 1, in the embodiment, the touch display device 100 includes a touch display panel 110, a touch display driving circuit 120 and a computing circuit 130. The touch display panel 110 may be implemented by any type of LCD touch display panel or LED touch display panel. The touch display driving circuit 120 is coupled to the touch display panel 110. The touch display driving circuit 120 drives the touch display panel 110 to perform a display operation based on a scan frequency FS and to perform a touch sensing operation based on touch sensing cycles. In the embodiment, the touch display driving circuit 120 may be implemented by a touch and display driver integration (TDDI) chip. The touch display driving circuit 120 drives the touch display panel 110 to perform the touch sensing operation by a touch sensing enable signal TPEN including at least touch sensing cycles C1 to C3, the disclosure is not limited thereto.

In the embodiment, the computing circuit 130 is coupled to the touch display driving circuit 120. The computing circuit 130 determines scan finishing positions PSF01 to PSF12 on the touch display panel 110 in response to the scan frequency FS and the touch sensing cycles C1 to C3. When the display operation is paused or stopped, a voltage variation a gate driving voltage of a scan driving may interfere with the following the touch sensing operation. Therefore, the scan finishing positions PSF01 to PSF12 are interfered scan positions. In other words, the scan finishing positions PSF01 to PSF12 are scan positions when the display operation is stopped and a corresponding touch sensing cycle among the touch sensing cycles started.

The computing circuit 130 receives a touch sensing data DTS corresponding to the scan finishing positions PSF01 to PSF12, and compensates the touch sensing data DTS based on a base value BV. In the embodiment, the base value BV may be a base line value of the touch display panel 110. In the embodiment, the computing circuit 130 may be a central processing unit (CPU) or other programmable general-purpose or specific-purpose microprocessor, digital signal processor (DSP), programmable controller, application specific integrated circuit (ASIC), programmable logic device (PLD), other similar devices, or a combination thereof. The computing circuit 130 is capable of loading and executing a computer program to complete a corresponding operational function. In an embodiment, the computing circuit 130 may also achieve various operational functions through implementation of hardware circuits, and sufficient teaching, suggestions, and implementation details about the detailed steps and implementation are already provided in the common knowledge of the field. In some embodiments, the computing circuit 130 may be embedded or configured in the touch display driving circuit 120.

It should be noted, the computing circuit 130 determines the scan finishing positions PSF01 to PSF12 on the touch display panel 110 in response to the scan frequency FS and the touch sensing cycles and receive the touch sensing data DTS corresponding to the scan finishing positions PSF01 to PSF12 and compensate the touch sensing data DTS based on the base value BV. Therefore, the touch display device 100 could reduce the affected on the touch sensing operation by noises located on the scan finishing positions PSF01 to PSF12. The noises are generated from the scan driving of the display operation. For example, the scan driving may be a gate-in-panel (GIP) scan driving. The noises may be GIP noises.

For example, the touch display panel 110 may drive the touch display panel 110 in a LongH mode. In the LongH mode, the touch sensing cycles are inserted into the display operation. Since the touch sensing cycles is inserted into the display operation based on touch sensing frames, the computing circuit 130 can receive the touch sensing cycles and the scan frequency through the touch display driving circuit 120. In a first touch sensing frame, in the touch sensing cycle C1, the display operation is paused on a region row RR1 and the touch sensing operation is performed on region columns RC1 and RC6. In the touch sensing cycle C2, the display operation is paused on a region row RR2 and the touch sensing operation is performed on region columns RC2 and RC5. In the touch sensing cycle C3, the display operation is paused on a region row RR3 and the touch sensing operation is performed on region columns RC3 and RC4. Therefore, in the first touch sensing frame, the computing circuit 130 may determine the scan finishing positions PSF01 and PSF02 based on the scan frequency FS and the touch sensing cycle C1, determine the scan finishing positions PSF03 and PSF04 based on the scan frequency FS and the touch sensing cycle C2, and determine the scan finishing positions PSF05 and PSF06 based on the scan frequency FS and the touch sensing cycle C3.

In a second touch sensing frame, in the touch sensing cycle C1, the display operation is paused on a region row RR4 and the touch sensing operation is performed on region columns RC1 and RC6. In the touch sensing cycle C2, the display operation is paused on a region row RR5 and the touch sensing operation is performed on region columns RC2 and RC5. In the touch sensing cycle C3, the display operation is paused on a region row RR6 and the touch sensing operation is performed on region columns RC3 and RC4. Therefore, in the first touch sensing frame, the computing circuit 130 may determine the scan finishing positions PSF07 and PSF08 based on the scan frequency FS and the touch sensing cycle C1, determine the scan finishing positions PSF09 and PSF10 based on the scan frequency FS and the touch sensing cycle C2, and determine the scan finishing positions PSF11 and PSF12 based on the scan frequency FS and the touch sensing cycle C3.

Each of the region rows RR1 to RR6 has at least one touch sensing pixel row. Each of the region columns RC1 to RC6 has at least one touch sensing pixel column. Therefore, each of the scan finishing positions has at least one touch sensing pixel.

For the convenience of description, this implementation uses the scan finishing positions PSF01 to PSF12, the region rows RR1 to RR6 and the region columns RC1 to RC6 as an example, the disclosure is not limited thereto. A number and locations of the scan finishing positions, a number and locations of the region rows and a number and locations of the region columns may be variated based on a number of touch sensing frame, a design of the touch display panel 110 and the scan frequency FS.

In the embodiment, the computing circuit 130 receives the touch sensing data DTS through the touch display driving circuit 120. The computing circuit 130 generates a compensating data DC of the touch sensing data DTS corresponding to the scan finishing positions PSF01 to PSF12 based on the base value BV. Detailly, the computing circuit 130 receives the touch sensing data DTS at a test stage when the touch display panel have no touch behavior and generates the compensating data DC of the touch sensing data DTS corresponding to the scan finishing positions PSF01 to PSF12 based on the base value BV. The computing circuit 130 compensates data values of the touch sensing data DTS to the base value BV by the compensating data DC. Therefore, when the touch display panel have no touch behavior, the data values of the touch sensing data DTS are the base value BV approximately.

In the embodiment, the touch display driving circuit 120 may control the touch display panel 110 to perform the display operation without scan line shifting or with scan line shifting. The touch display driving circuit 120 controls the display operation without the scan line shifting based on fixed the scan frequency FS. The touch display driving circuit 120 controls the display operation without the scan line shifting based on a fixed scan number. Therefore, the scan finishing positions PSF01 to PSF12 are fixed based on the display operation without the scan line shifting. The touch display driving circuit 120 controls the display operation with the scan line shifting based on a variable scan number. Therefore, the scan finishing positions PSF01 to PSF12 are variable based on the display operation with the scan line shifting. In the embodiment, based on the scan number from the touch display driving circuit 120, the computing circuit 130 may determine the scan finishing positions PSF01 to PSF12 regardless the scan line shifting.

Figure 2:
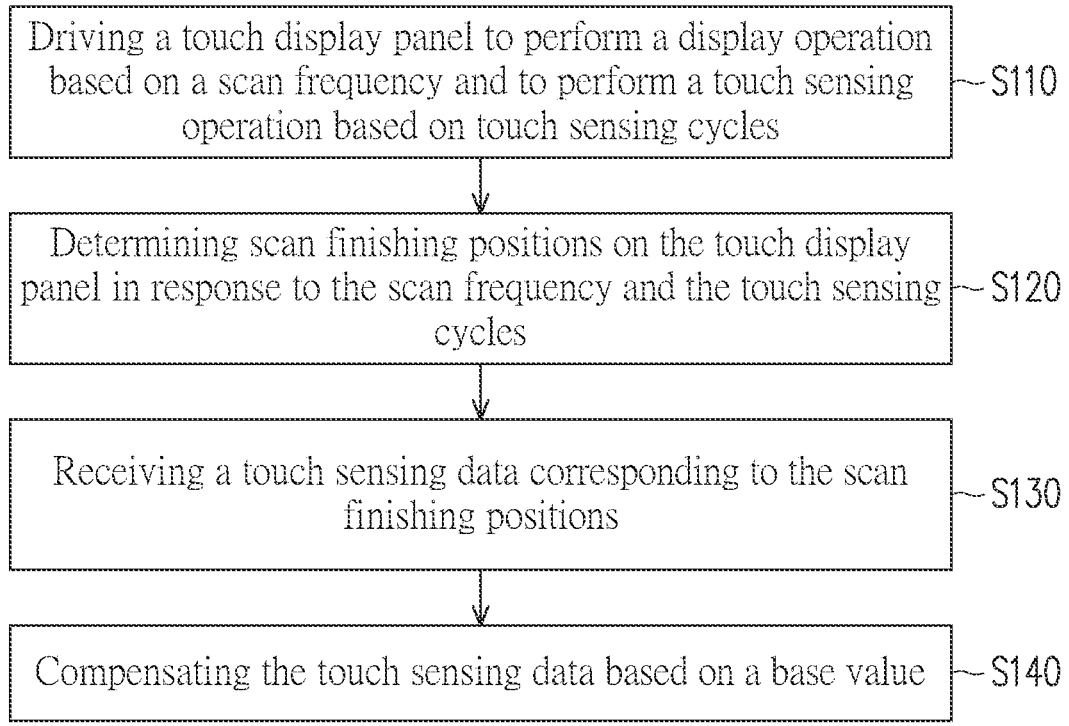
FIG. 2 illustrates a flowchart of an operating method according to a first embodiment of the disclosure.

FIG. 2 illustrates a flowchart of an operating method according to a first embodiment of the disclosure. Referring to FIG. 1 and FIG. 2, the operating method is applicable to the touch display device 100. In the embodiment, at step S110, the touch display driving circuit 120 drives the touch display panel 110 to perform the display operation based on the scan frequency FS and to perform the touch sensing operation based on touch sensing cycles C1 to C3. At step S120, the computing circuit 130 determines the scan finishing positions PSF01 to PSF12 on the touch display panel 110 in response to the scan frequency FS and the touch sensing cycles C1 to C3. At step S130, the computing circuit 130 receives the touch sensing data DTS corresponding to the scan finishing positions PSF01 to PSF12. At step S140, the computing circuit 130 compensates the touch sensing data DTS based on the base value BV. The implementation details of the steps S110 to S140 may be sufficiently taught in the embodiment in FIG. 1 and are not repeated herein.

Figure 3:
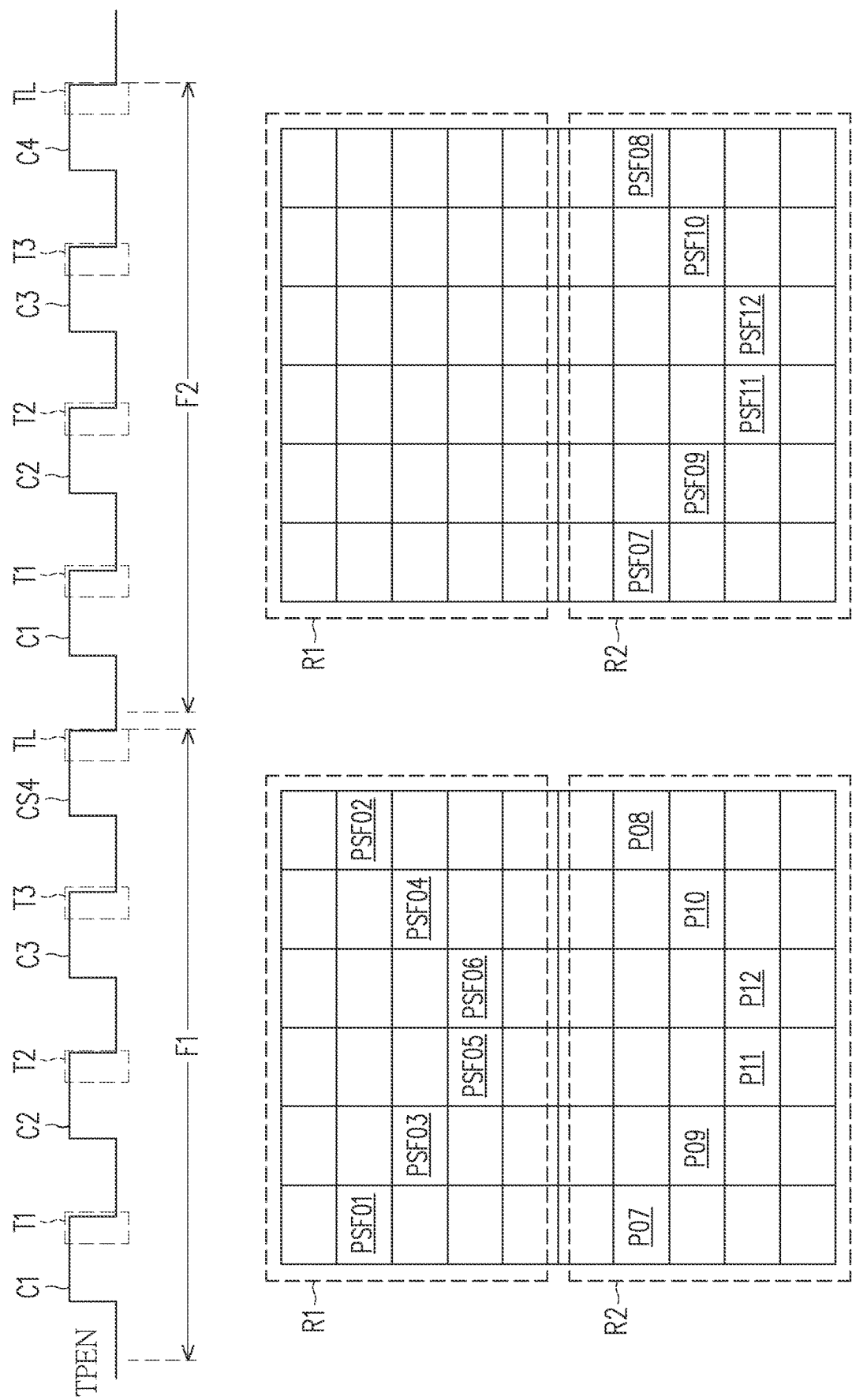
FIG. 3 illustrates an operating timing of a touch sensing enable signal and scan finishing positions according to a first embodiment of the disclosure.

FIG. 3 illustrates an operating timing of a touch sensing enable signal and scan finishing positions according to a first embodiment of the disclosure. Referring to FIG. 1 and FIG. 3, in the embodiment, the touch sensing enable signal TPEN has positive pulse waves corresponding to the touch sensing cycles C1 to C3 and a listen cycle CS4 per touch sensing frame. The listen cycle CS4 is after the touch sensing cycles C1 to C3. For example, in a touch sensing frame F1, the touch sensing enable signal TPEN has positive pulse waves corresponding to the touch sensing cycles C1 to C3 and the listen cycle CS4. In a touch sensing frame F2, the touch sensing enable signal TPEN also has positive pulse waves corresponding to the touch sensing cycles C1 to C3 and the listen cycle CS4. In the embodiment, the computing circuit 130 compensates the touch sensing data DTS in the listen cycle CS4.

In the embodiment, the touch display panel 110 performs the touch sensing operation in the touch sensing cycles C1 to C3. The touch display panel 110 performs the display operation when the touch sensing enable signal TPEN has a low voltage.

In the touch sensing cycle C1 of the touch sensing frame F1, the computing circuit 130 determines the scan finishing positions PSF01 and PSF02 in a region R1 of the touch display panel 110 in a time period T1. The time period T1 is a finishing time period of the touch sensing cycle C1. In the touch sensing cycle C1 of the touch sensing frame F1, the computing circuit 130 receives a touch sensing data DTS corresponding to the scan finishing positions PSF01 and PSF02 in the time period T1. Besides, In the touch sensing cycle C1 of the touch sensing frame F1, the computing circuit 130 receives a touch sensing data DTS corresponding to the positions P07 and P08 in a region R2 of the touch display panel 110. It should be noted, in the touch sensing frame F1, the region R2 does not perform the scan driving of the display operation. The touch sensing data DTS corresponding to the positions P07 and P08 is not interfered. Therefore, data values of the touch sensing data DTS corresponding to the positions P07 and P08 are the base value BV (that is, base line value) approximately.

In the touch sensing cycle C2 of the touch sensing frame F1, the computing circuit 130 determines the scan finishing positions PSF03 and PSF04 in the region R1 of the touch display panel 110 in a time period T2. The time period T2 is a finishing time period of the touch sensing cycle C2. In the touch sensing cycle C2 of the touch sensing frame F1, the computing circuit 130 receives a touch sensing data DTS corresponding to the scan finishing positions PSF03 and PSF04 in the time period T2. Besides, In the touch sensing cycle C2 of the touch sensing frame F1, the computing circuit 130 receives a touch sensing data DTS corresponding to the positions P09 and P10 in a region R2 of the touch display panel 110. In the touch sensing frame F1, the region R2 does not perform the scan driving of the display operation. The touch sensing data DTS corresponding to the positions P09 and P10 is not interfered. Therefore, data values of the touch sensing data DTS corresponding to the positions P09 and P10 are the base value BV approximately.

In the touch sensing cycle C3 of the touch sensing frame F1, the computing circuit 130 determines the scan finishing positions PSF05 and PSF06 in the region R1 of the touch display panel 110 in a time period T3. The time period T3 is a finishing time period of the touch sensing cycle C3. In the touch sensing cycle C3 of the touch sensing frame F1, the computing circuit 130 receives a touch sensing data DTS corresponding to the scan finishing positions PSF05 and PSF06 in the time period T3. Besides, In the touch sensing cycle C3 of the touch sensing frame F1, the computing circuit 130 receives a touch sensing data DTS corresponding to the positions P11 and P12 in a region R2 of the touch display panel 110. In the touch sensing frame F1, the region R2 does not perform the scan driving of the display operation. The touch sensing data DTS corresponding to the positions P11 and P12 is not interfered. Therefore, data values of the touch sensing data DTS corresponding to the positions P11 and P12 are the base value BV approximately.

In the listen cycle CS4 of the touch sensing frame F1, the computing circuit 130 compensates the touch sensing data DTS corresponding to the scan finishing positions PSF01 to PSF06 based on the base value BV in a time period TL. The time period TL is in the listen cycle CS4. For example, the time period TL may be a finishing time period of the listen cycle CS4. The computing circuit 130 generates compensating data DC corresponding to the scan finishing positions PSF01 to PSF06 according to the base value BV and the touch sensing data DTS corresponding to the scan finishing positions PSF01 to PSF06.

In the touch sensing cycle C1 of the touch sensing frame F2, the computing circuit 130 determines the scan finishing positions PSF07 and PSF08 in a region R2 of the touch display panel 110 in a time period T1. Besides, in the touch sensing cycle C1 of the touch sensing frame F2, the computing circuit 130 receives a touch sensing data DTS corresponding to the scan finishing positions PSF07 and PSF08 in the time period T1.

In the touch sensing cycle C2 of the touch sensing frame F2, the computing circuit 130 determines the scan finishing positions PSF09 and PSF10 in a region R2 of the touch display panel 110 in a time period T2. Besides, in the touch sensing cycle C2 of the touch sensing frame F2, the computing circuit 130 receives a touch sensing data DTS corresponding to the scan finishing positions PSF09 and PSF10 in the time period T2.

In the touch sensing cycle C3 of the touch sensing frame F2, the computing circuit 130 determines the scan finishing positions PSF11 and PSF12 in a region R2 of the touch display panel 110 in a time period T3. Besides, in the touch sensing cycle C3 of the touch sensing frame F2, the computing circuit 130 receives a touch sensing data DTS corresponding to the scan finishing positions PSF11 and PSF12 in the time period T3.

In the listen cycle CS4 of the touch sensing frame F2, the computing circuit 130 compensates the touch sensing data DTS corresponding to the scan finishing positions PSF07 to PSF12 based on the base value BV in a time period TL. The time period TL is in the listen cycle CS4. For example, the time period TL may be a finishing time period of the listen cycle CS4. The computing circuit 130 generates compensating data DC corresponding to the scan finishing positions PSF07 to PSF12 according to the data values of the touch sensing data DTS corresponding to the positions P07 and P12 (that is, the base value BV) and the touch sensing data DTS corresponding to the scan finishing positions PSF07 to PSF12.

In the embodiment, the computing circuit 130 subtracts the touch sensing data DTS corresponding to the scan finishing positions PSF07 in the touch sensing frame F2 from the touch sensing data DTS corresponding to the positions P07 in the touch sensing frame F1 to generate the compensating data DC corresponding to the scan finishing positions PSF07. The computing circuit 130 subtracts the touch sensing data DTS corresponding to the scan finishing positions PSF08 in the touch sensing frame F2 from the touch sensing data DTS corresponding to the positions P08 in the touch sensing frame F1 to generate the compensating data DC corresponding to the scan finishing positions PSF08, and so on. In other words, the computing circuit 130 performs subtraction computation on the base value BV and the touch sensing data DTS to generate the compensating data DC.

In the embodiment, time intervals between two adjacent touch sensing cycles are roughly the same. The touch display panel 110 performs the display operation without scan line shifting. In some embodiments, the time intervals between two adjacent touch sensing cycles may be different. The touch display panel 110 performs the display operation with scan line shifting.

Figure 4:
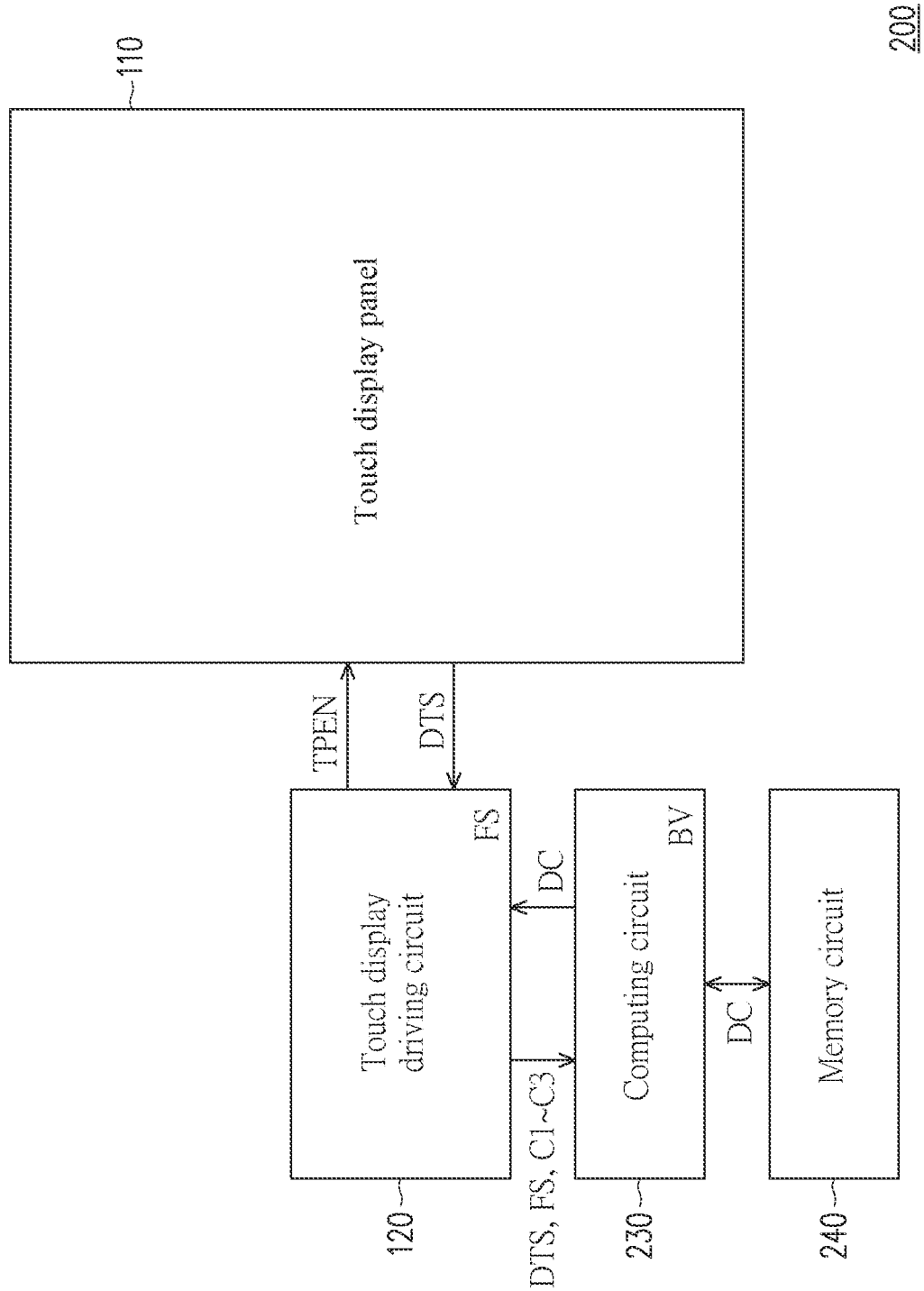
FIG. 4 illustrates a schematic diagram of a touch display device according to a second embodiment of the disclosure.

FIG. 4 illustrates a schematic diagram of a touch display device according to a second embodiment of the disclosure. Referring to FIG. 4, in the embodiment, the touch display device 200 includes the touch display panel 110, the touch display driving circuit 120, a computing circuit 230 and a memory circuit 240. Operations of the touch display panel 110 and the touch display driving circuit 120 may be sufficiently taught in the embodiment in FIG. 1 and are not repeated herein.

In the embodiment, the computing circuit 230 is coupled to the touch display driving circuit 120. The computing circuit 230 determines scan finishing positions (for example, the scan finishing positions PSF01 to PSF12 in FIG. 1) on the touch display panel 110 in response to the scan frequency FS and the touch sensing cycles C1 to C3. The computing circuit 230 receives a touch sensing data DTS corresponding to the scan finishing positions and compensates the touch sensing data DTS based on a base value BV. The above operations of the computing circuit 230 may be sufficiently taught in the embodiments in FIG. 1 and FIG. 3 and are not repeated herein.

In the embodiment, the memory circuit 240 is coupled to the computing circuit 230. The memory circuit 240 stores the compensating data DC corresponding to the scan finishing positions. In the embodiment, the computing circuit 230 generates the compensating data DC the compensating data DC and stores the compensating data DC into the memory circuit 240. The computing circuit 230 uses the compensating data DC stored in the memory circuit 240 to compensate the touch sensing data DTS corresponding to the scan finishing positions when receiving the touch sensing data DTS.

In the embodiment, the memory circuit 240 includes a compensation table. The compensation table records scan lines and compensating values of the compensating data DC corresponding to the scan finishing positions as shown in below.

The Compensation Table:

| scan line | compensating value 1 | compensating value 2 | compensating value 3 | ... |
|---|---|---|---|---|
| 208 | 385 | 390 | 367 | ... |
| 224 | 381 | 383 | 370 | ... |
| 240 | 246 | 248 | 259 | ... |
| ... | ... | ... | ... | ... |

The scan lines in the compensation table are the scan finishing lines when the display operation is paused or stopped based on the touch sensing cycles C1 to C3. The compensating values corresponding each scan lines are the compensating data DC of different touch sensing pixels in the scan finishing positions.

In the embodiment, a size of the compensation table depends on a number of the touch sensing frame, a variation of the scan number (that is, the display operation with the scan line shifting or without the scan line shifting) and the design of the touch display panel 110. In other words, a capacity of the memory circuit 240 depends on a number of the touch sensing frame, a variation of the scan number (that is, the display operation with the scan line shifting or without the scan line shifting) and the design of the touch display panel 110.

In the embodiment, the memory circuit 240 may be implemented by any type of a data storage medium, such as dynamic random access memory (DRAM), including synchronous DRAM (SDRAM), magnetoresistive RAM (MRAM), resistive RAM (RRAM), or other types of memory devices.

In some embodiments, the memory circuit 240 may be may be embedded or configured in the computing circuit 230.

In summary, in the disclosure, the touch display device and the operating method determine the scan finishing positions on the touch display panel in response to the scan frequency and the touch sensing cycles. The touch display device and the operating method obtain the scan finishing positions. The touch display device and the operating method receive the touch sensing data corresponding to the scan finishing positions and compensate the touch sensing data based on the base value. Therefore, the touch display device and the operating method reduce the affected on the touch sensing operation by noises located on the scan finishing positions. The noises are generated from the scan driving of the display operation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch display device, comprising:
   a touch display panel;
   a touch display driving circuit, coupled to the touch display panel, configured to drive the touch display panel to perform a display operation based on a scan frequency and to perform a touch sensing operation based on a plurality of touch sensing cycles; and
   a computing circuit, coupled to the touch display driving circuit, configured to determine a plurality of scan finishing positions on the touch display panel in response to the scan frequency and the plurality of touch sensing cycles, receive a touch sensing data corresponding to the plurality of scan finishing positions, and compensate the touch sensing data based on a base value,
   wherein the touch sensing operation is performed based on the plurality of touch sensing cycles in a touch sensing frame, wherein the computing circuit compensates the touch sensing data in a listen cycle in the touch sensing frame, and wherein the listen cycle is after the plurality of touch sensing cycles.

2. The touch display device of claim 1, wherein the computing circuit receives the plurality of touch sensing cycles, the scan frequency and the touch sensing data through the touch display driving circuit.

3. The touch display device of claim 1, wherein a plurality of first scan finishing positions among the plurality of scan finishing positions are a plurality of scan positions when the display operation is stopped and a first touch sensing cycle among the plurality of touch sensing cycles started.

4. The touch display device of claim 1, wherein the computing circuit receives the touch sensing data at a test stage when the touch display panel have no touch behavior and generates a compensating data of the touch sensing data corresponding to the plurality of scan finishing positions based on the base value.

5. The touch display device of claim 4, further comprising:
   a memory circuit, coupled to the computing circuit, configured to store the compensating data corresponding to the plurality of scan finishing positions,
   wherein when receiving the touch sensing data corresponding to the plurality of scan finishing positions, the computing circuit uses the compensating data stored in the memory circuit to compensate the touch sensing data.

6. The touch display device of claim 4, wherein the computing circuit performs a subtraction computation on the base value and the touch sensing data to generate a compensating data.

7. An operating method for a touch display device, wherein the touch display device comprises a touch display panel and a touch display driving circuit, wherein the operating method comprising:
   driving, by the touch display driving circuit, the touch display panel to perform a display operation based on a scan frequency and to perform a touch sensing operation based on a plurality of touch sensing cycles;
   determining a plurality of scan finishing positions on the touch display panel in response to the scan frequency and the plurality of touch sensing cycles;
   receiving a touch sensing data corresponding to the plurality of scan finishing positions; and
   compensating the touch sensing data based on a base value,
   wherein the touch sensing operation is performed based on the plurality of touch sensing cycles in a touch sensing frame, wherein compensating the touch sensing data based on the base value comprising:
      compensating the touch sensing data in a listen cycle in the touch sensing frame, wherein the listen cycle is after the plurality of touch sensing cycles.

8. The operating method of claim 7, wherein receiving the touch sensing data corresponding to the plurality of scan finishing positions comprising:
   receiving the plurality of touch sensing cycles, the scan frequency and the touch sensing data through the touch display driving circuit.

9. The operating method of claim 7, wherein a plurality of first scan finishing positions among the plurality of scan finishing positions are a plurality of scan positions when the display operation is stopped and a first touch sensing cycle among the plurality of touch sensing cycles started.

10. The operating method of claim 7, wherein receiving the touch sensing data corresponding to the plurality of scan finishing positions comprising:
    receiving the touch sensing data at a test stage when the touch display panel have no touch behavior and generates a compensating data of the touch sensing data corresponding to the plurality of scan finishing positions based on the base value.

11. The operating method of claim 10, wherein the touch display device further comprises a memory circuit, wherein the operating method further comprising:
    storing the compensating data corresponding to the plurality of scan finishing positions into the memory circuit; and
    using the compensating data stored in the memory circuit to compensate the touch sensing data when receiving the touch sensing data corresponding to the plurality of scan finishing positions.

12. The operating method of claim 7, wherein compensating the touch sensing data based on the base value comprising:
    performing a subtraction computation on the base value and the touch sensing data to generate a compensating data.

* * * * *